United States Patent [19]

Scheier et al.

[11] 3,958,303
[45] May 25, 1976

[54] METHOD AND APPARATUS FOR POULTRY VENT REMOVAL

[75] Inventors: Donald Joseph Scheier; Homer Augusta Haynes, both of Kansas City; J. D. Hawthorn, Independence; Henry Evans Frederick, Parkville, all of Mo.

[73] Assignee: Gordon Johnson Company, Kansas City, Mo.

[22] Filed: Dec. 16, 1974

[21] Appl. No.: 532,826

[52] U.S. Cl. ............................................. 17/11.1 R
[51] Int. Cl.² ........................................... A22B 3/08
[58] Field of Search .......... 17/11 R, 11.1 A, 11.1 C, 17/43

[56] References Cited
UNITED STATES PATENTS

| | | | |
|---|---|---|---|
| 3,526,018 | 9/1970 | Lovitt | 17/11 |
| 3,605,179 | 9/1971 | Harben | 17/11 |
| 3,786,535 | 1/1974 | La Barber | 17/11 |
| 3,806,988 | 4/1974 | Harben | 17/11 |

*Primary Examiner*—Louis G. Mancene
*Assistant Examiner*—Robert Cutting
*Attorney, Agent, or Firm*—Schmidt, Johnson, Hovey & Williams

[57] ABSTRACT

Poultry carcasses are suspended by their legs and advanced by an overhead conveyor to a machine which automatically severs the vent from each carcass in succession as advancement continues and then partially withdraws each severed vent from its carcass to drape the same over the outside of the carcass for inspection. Each carcass is initially positioned angularly against a support so that the cutter begins severance generally toward the backbone of the carcass, whereupon the carcass is rocked inwardly toward the support and relative to the cutter to position the backbone flatly against the support and generally in line with the cutter. This motion causes the cutter to move along rather than toward the backbone during the short period of further severance so that membranes attaching urinary organs and muscular tissues to the backbone are fully severed. A short segment of helical flighting around the outside of the cutter engages fatty tissues surrounding the vent during entry of the cutter and causes such tissues to climb up the cutter so as to assure complete severance without requiring entry of the cutter to such an extent that entrails might be severed to spill fecal contaminants throughout the carcass. Vacuum pressure applied through the cutterhead adheres the severed vent to the cutter such that when the latter is retracted from the carcass, the vent is pulled partially therefrom until the vacuum pressure is discontinued to release the vent.

21 Claims, 15 Drawing Figures

METHOD AND APPARATUS FOR POULTRY VENT REMOVAL

This invention relates to the automated processing of poultry carcasses and, more particularly, to an early procedure in the evisceration process in which the rectum, or "vent" as it is commonly referred to in the industry, is severed from the carcass and partially withdrawn therefrom for inspection.

Many previous techniques have been developed for carrying out this processing step, the crudest of which has involved simply manually cutting around the vent with a knife and then partially withdrawing the severed material from the carcass. Other procedures have involved the use of "handguns" in the nature of piston grip devices provided with rotary cutters which encircle the vent and sever the tissues about the vent from the carcass when the trigger of the device is actuated. Such latter devices also commonly employ vacuum to adhere the severed vent to the cutter for purposes of withdrawing the vent from the carcass.

A major shortcoming with such previous techniques, however, has been the fact that they are essentially time-consuming, manual operations, requiring a relatively high degree of skill to insure that the proper cut is made with minimum wastage and without severing the entrails to spill fecal matter over meaty portions of the carcass. Moreover, government regulations require that urinary organs be removed with the vent, as well as the sphincter muscle which controls contraction and relaxation of the vent, and this can be considerably difficult because of strong membranes that attach the organs and muscle to the backbone. Unless considerable care and attention is given during the hand operation, the membranes might not be completely broken, the organs and muscle simply torn apart rather than fully removed, and the meaty portions spoiled by contamination.

Accordingly, it is one important object of the present invention to overcome the shortcomings of previous manual vent-removing operations by providing a novel method and apparatus for automatically removing the vents from poultry carcasses in a safe, sanitary and efficient manner as the carcasses are continuously advanced along a conveying line.

Another important object of this invention is to provide for a unique rocking of each carcass as its cutter is applied to the tissues surrounding the vent so that the cutter initially approaches the backbone at an angle and then moves substantially parallel thereto in order to fully sever membranes which attach urinary organs and the sphincter muscle to the backbone.

An additional important object of this invention is to accomplish complete severance of the fatty tissues which surround the vent without forcing the cutter so far into the body cavity that the intestines might be severed to spill their contaminants.

Pursuant to the foregoing object an important provision of this invention is a short segment of helical flighting around the outside of each rotary cutter which forces the fatty tissues to climb up the cutter as the latter begins severance, thereby enabling the cutter to be held against further entry into the body cavity while the climbing tissues sever themselves on the cutter.

A further important object of this invention is to provide means for adjusting the timing and structural relationships of various components of the vent-removing machine so as to adapt the machine for processing carcasses which may vary substantially in size and weight from one production run to another.

The machine of the present invention is basically in the nature of a turret, rotatable about a vertical axis, to which poultry carcasses are presented by an overhead conveyor 20 moving along a guide track 22 that leads into and around the machine generally about its outer, arcuate periphery. As shown best in FIG. 5, the carcasses are presented to the machine through an entry denoted generally by the numeral 24, travel in a clockwise direction about the machine for approximately 180°, and then leave the machine through an exit denoted generally by the numeral 26.

Figures 2, 3, 4:
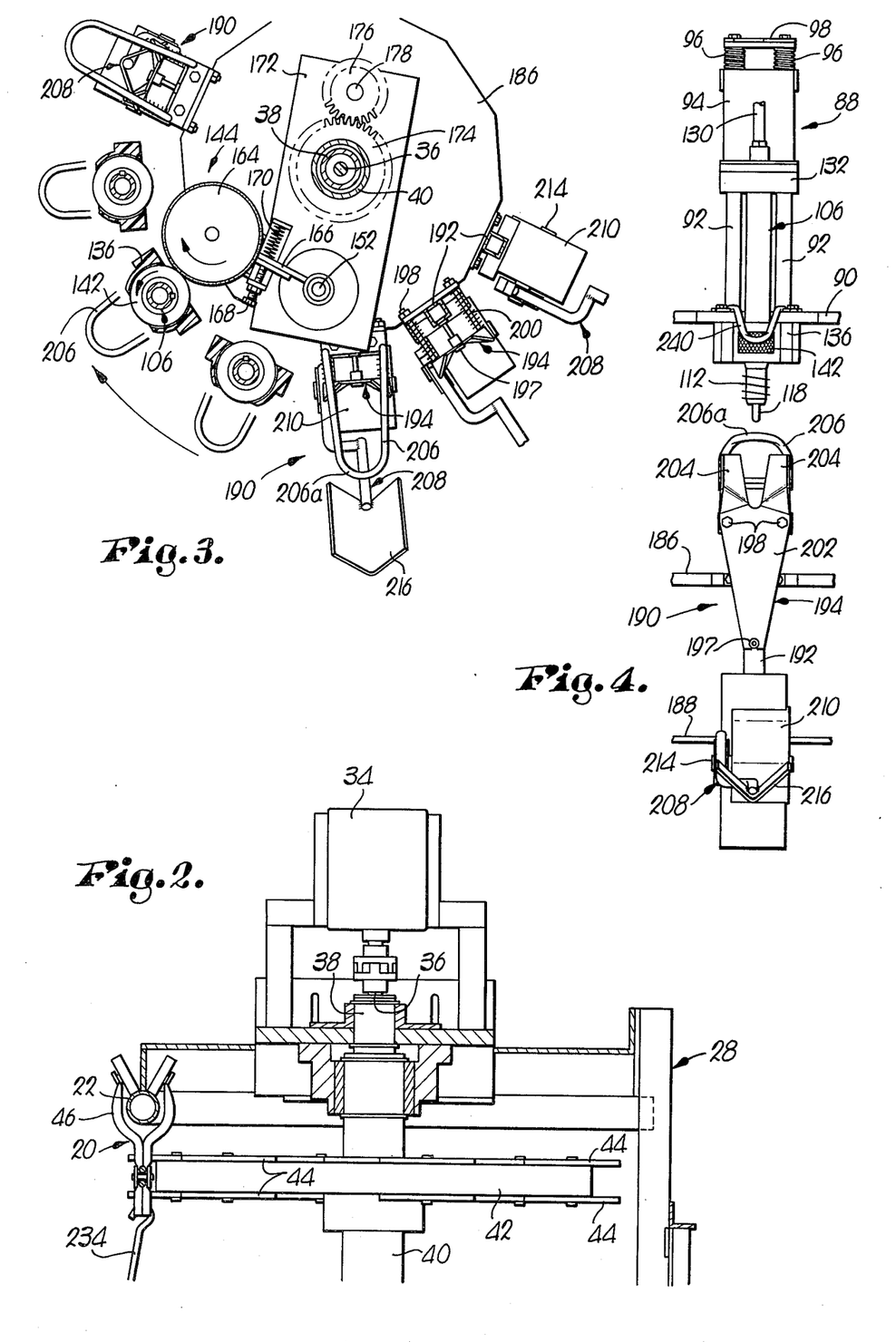
FIG. 2 is a fragmentary, elevational view, partially in cross-section, illustrating the top portions of the apparatus not shown in FIG. 1.
FIG. 3 is a horizontal cross-sectional view through the apparatus taken substantially along line 3—3 of FIG. 1.
FIG. 4 is a fragmentary, elevational view of one carriage and its cutter assembly.
Figures 5, 6:
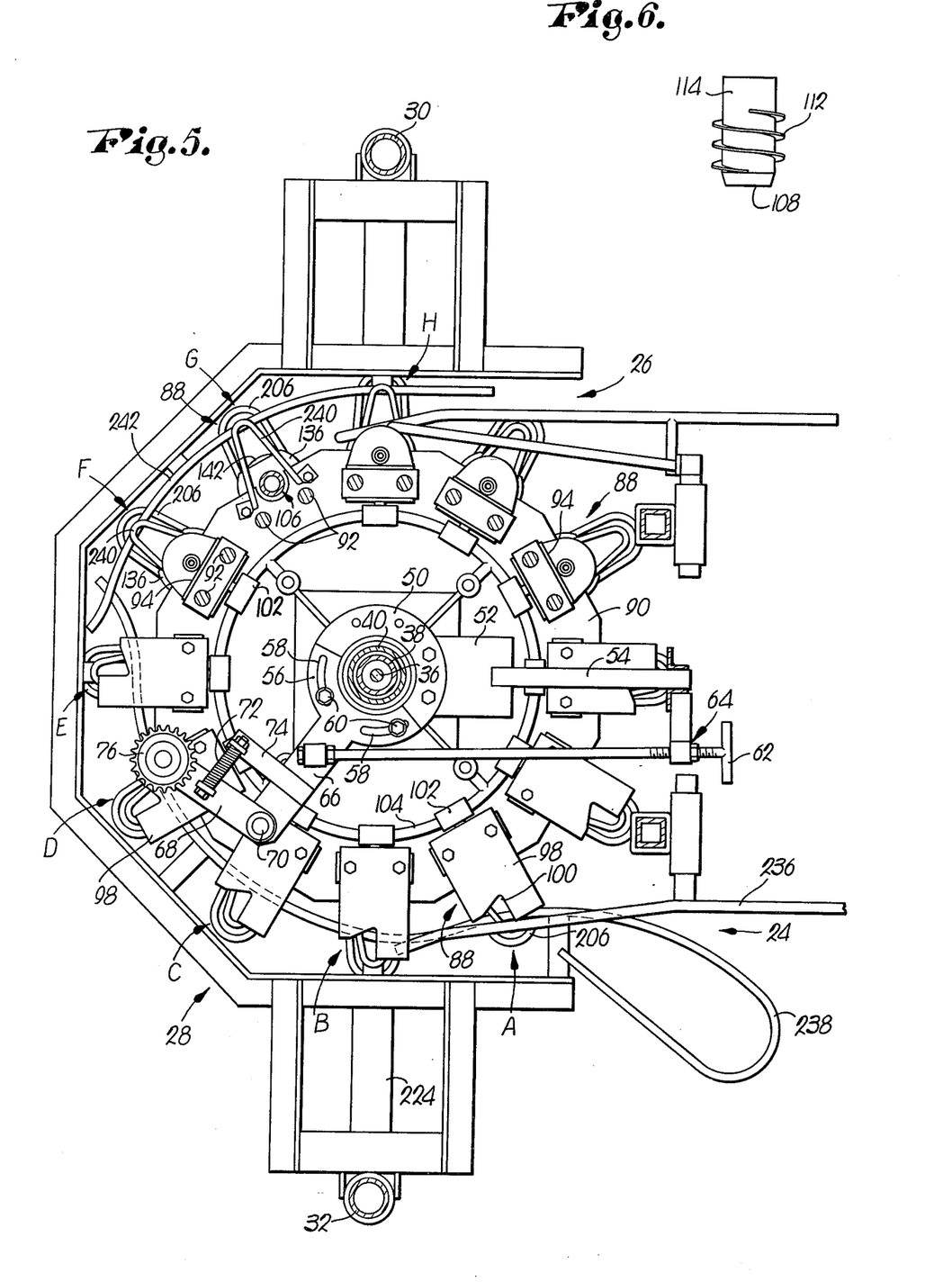
FIG. 5 is a horizontal cross-sectional view through the apparatus taken along line 5—5 of FIG. 1.
FIG. 6 is an enlarged elevational view of the lower end of one cutter illustrating its helical flighting.

As also shown best in FIG. 5, the machine is supported by a framework 28 that is generally C-shaped in top plan and by upright pipes 30 and 32 on opposite sides of framework 28. As shown in FIG. 2, a motor 34 is supported by framework 28 centrally of the latter and is drivingly coupled with a long, relatively small diameter drive shaft 36 that defines the central axis of the machine and that extends from the top of the machine downwardly to approximately the vertical midpoint of the machine. A larger, stationary tube 38 coaxially houses shaft 36 and also extends downwardly from the top of the machine to approximately the vertical midpoint of the latter. Receiving the stationary tube 38 is a larger rotatable tube 40 that serves as the primary drive for the rotatable structure of the turret-like machine, the innermost drive shaft 36 serving only as a drive for the rotary cutters of the machine as will hereinafter be made apparent.

Figure 1:
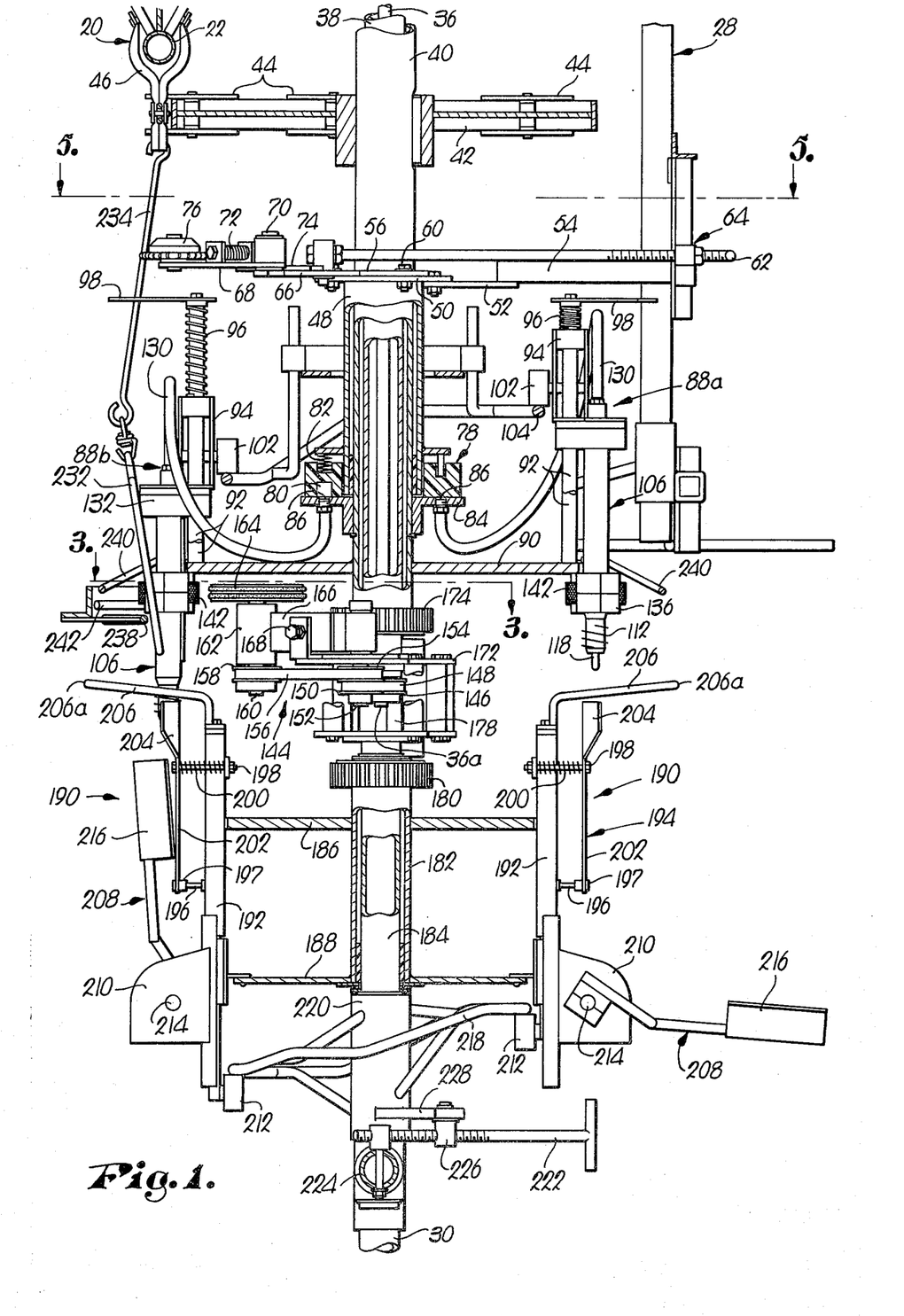
FIG. 1 is a fragmentary, elevational view of apparatus constructed in accordance with the principles of the present invention and capable of carrying out our novel method, parts of the apparatus being broken away to reveal details of construction, and portions being illustrated in cross section for clarity.

As shown in FIGS. 1 and 2, the drive tube 40 has an impulse wheel 42 keyed thereto, and the wheel 42 is provided with a series of retainers 44 spaced circumferentially about its periphery for receiving between each pair of retainers 44 one of the yokes 46 of the conveyor 20 such that when yokes 46 are driven by mechanism not illustrated, they will in turn drive the impulse wheel 42 so as to rotate the tube 40. Thus, the rotative motion supplied to the machine is imparted through the conveyor 20 itself and not through an independent drive source associated with the machine.

A short distance below the impulse wheel 42 is located a stationary, relatively short, outermost tube 48 that surrounds the drive tube 40 but is held against rotation therewith. A circular plate 50, secured to the top of outermost tube 48, is fixedly connected to frame 28 by generally radially extending members 52 and 54, and a shiftable, crescent-shaped plate 56 overlies plate 50 and is provided with a pair of arcuate slots 58 that receive bolts 60 interconnecting plates 50 and 56. Bolts 60 are loose enough to permit angular adjustment of plate 56 relative to plate 50 when a handle 62 is rotated through a threaded connection 64 with frame 28 in order to push or pull a radially extending arm 66 that is integral with the adjustable plate 56. A second arm 68 is swingably joined to arm 66 through a pivot 70 at the outermost end of arm 66 and is yieldably biased generally radially outwardly by a spring assembly 72 interconnecting swingable arm 68 and a transversely extending component 74 on arm 66. The outermost free end of swingable arm 68 carries a freewheeling sprocket wheel 76, and through the construction above described, the sprocket wheel 76 is biased outwardly by spring assembly 72 to the position illustrated in FIGS. 1 and 5, the circumferential position of sprocket wheel 76 being changeable through the provision of handle 62 which may be turned in the appropriate direction to push or pull arm 66 to the extent necessary to adjust the position of sprocket 76.

An annular manifold 78 encircles the outermost tube 48 adjacent the lower end thereof and is provided with an arcuate chamber 80 that extends for less than 180° within manifold 78. Chamber 80 is coupled with a source of vacuum pressure (not shown) and is strategically located so as to supply vacuum pressure to the cutters of the machine only during a predetermined interval of their movement as yet to be discussed. Springs 82 spaced about outermost tube 48 bias manifold 78 downwardly against a plate 84 that is secured to the drive tube 40 for rotation therewith and is provided with a number of circumferentially spaced ports 86 that may be brought into registration with chamber 80 during rotation of the plate 84 with drive tube 40.

The ports 86 in plate 84 correspond in number to the cutter assemblies 88 that are spaced about the periphery of the machine, there being twelve of such assemblies 88 contemplated for use in the present machine. A large support plate 90 is affixed to the drive tube 40 below the ported plate 84, and the cutter assemblies 88 are positioned about the periphery of plate 90. Each assembly 88 includes a pair of circumferentially spaced, upstanding guide rods 92 that reciprocably carry a unit 94 for movement thereof between an uppermost position illustrated by the assembly 88a in FIG. 1, and a lowermost position illustrated by the assembly 88b in the same Figure. A pair of coil springs 96 surround each pair of rods 92 between the unit 94 and an uppermost, stationary plate 98 so as to bias the unit 94 downwardly, each plate 98 being generally rectangular as illustrated in FIG. 5 and having a notch 100 in one outermost corner. The springs 96 thus maintain a cam follower roller 102 of each unit 94 in firm engagement with a continuous cam rod 104 that encircles stationary, outermost tube 48 in radially spaced relationship thereto. The cam rod 104 is maintained in a stationary condition with outermost tube 48 during operation of the machine and is provided with stretches of various elevations and inclinations in order to control the vertical position of each unit 94 during operation.

Figure 7:
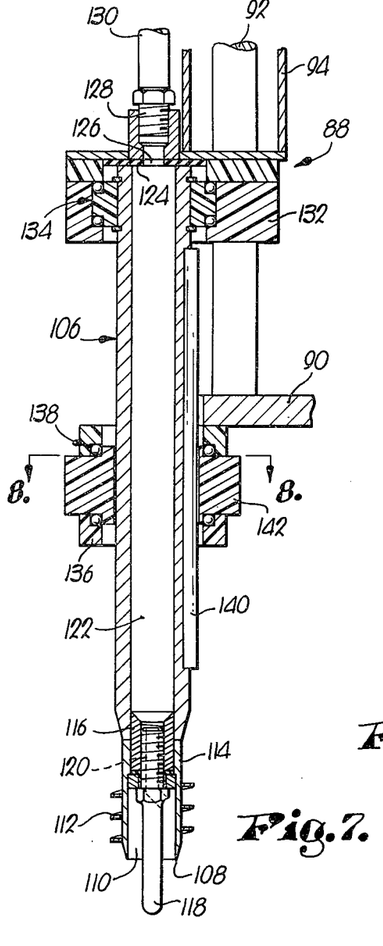
FIG. 7 is an enlarged, fragmentary, vertical cross-sectional view through a cutter assembly.
Figure 8:
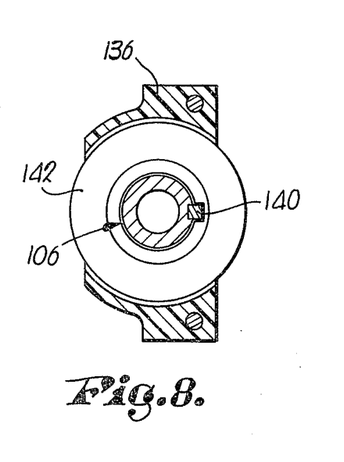
FIG. 8 is a horizontal cross-sectional view through the cutter assembly of FIG. 7 taken along line 8—8 of FIG. 7.

Each of the assemblies 88 further includes a rotary cutter 106 that is shown in detail in FIGS. 7 and 8, as well as generally throughout the remaining Figures. Each cutter 106 is in the nature of an elongated, cylindrical tube having an annular cutting edge 108 at its lower end and a relatively short chamber 110 extending from edge 108 upwardly toward the uppermost end of cutter 106. Three convolutions of helical flighting 112 surround the outside of the continuous annular wall 114 of cutter 106 leading away from edge 108 and set back a short distance therefrom. An internally threaded plug 116 at the upper end of short chamber 110 threadably receives a polished probe 118 that projects axially through chamber 110 and outwardly beyond cutting edge 108 as shown.

The plug 116 is open at its uppermost end and the probe 118 has a passage 120 that communicates the lower chamber 110 with a much larger chamber 122 extending upwardly from plug 116 to a perforated gasket 124 overlying the top of cutter 106. The hole 126 in gasket 124 communicates with a fitting 128 which receives a flexible hose 130 leading to a corresponding port 86 in the ported plate 84 so as to communicate chambers 110 and 122 of each cutter 106 with the manifold chamber 80 at a predetermined interval in the operation of the machine. Thus, the lowermost end of each cutter 106 adjacent its cutting edge 108 serves as a vacuum head when vacuum pressure is communicated thereto.

Each cutter 106 is supported at its upper end within a block 132 affixed to the unit 94 so that the cutter 106 reciprocates vertically with unit 94 as the follower roller 102 thereof moves along the cam rod 104. A bearing assembly 134 within block 132 supports cutter 106 for rotation about its longitudinal axis, and a stationary, enlarged collar 136 secured to support plate 90 below the latter carries a second bearing assembly 138 that cooperates with upper bearing assembly 134 to rotatably confine the cutter 106. The cutter 106 is also provided with a long key 140 that is shiftably received within a driven wheel 142 supported by the bearing assembly 138, such arrangement thereby premitting reciprocation of cutter 106 relative to driven wheel 142 as the latter remains vertically stationary with support plate 90 and yet coupling the cutter 106 and driven wheel 142 together for rotation relative to collar 136 when a driving force is applied to the wheel 142.

Driving power is supplied to the wheel 142 of each cutter 106 during only a relatively short interval as the assemblies 88 rotate about the central axis of the machine, and mechanism broadly denoted by the numeral 144 (shown best in FIGS. 1 and 3) is provided for accomplishing such driving of the cutters 106. Power to the constantly driven mechanism 144 is supplied through the internal drive shaft 36, and the shaft 36 terminates just below the vertical midpoint of the machine in a lowermost end 36a that is just slightly visible in FIG. 1. A first pulley 146 on shaft 36 just above end 36a is fixed to the shaft 36 and carries a short belt 148 that is also entrained about a second pulley 150 positioned radially outwardly from shaft 36 on an upright shaft 152. The driven shaft 152 also carries a third pulley 154 overlying second pulley 150 which in turn is operably coupled through a drive belt 156 to an outermost pulley 158 on another upright shaft 160. Shaft 160 is journaled for rotation within an upright sleeve 162, and the uppermost end of shaft 160 supports a drive wheel 164 having its periphery disposed for frictional engagement with the driven wheels 142 of cutters 106 as the latter move successively past the drive wheel 164. The direction of rotation of drive wheel 164 is clockwise viewing FIG. 3.

The sleeve 162 is carried at the outermost end of an arm 166 that is swingably supported at its opposite end by the same shaft 152 which carries pulleys 150 and 154. The arm 166 is biased outwardly against a setscrew 168 by a compression spring 170 mounted on a stationary, rectangular support shaft 172, and this arrangement permits the drive wheel 164 to be adjusted toward and away from the central axis of the machine along an arcuate path having its axis at shaft 152, thereby providing control over the point at which the driven wheels 142 of cutters 106 will successively engage drive wheel 164 and the duration of such engagement. This, then, permits accurate correlation of rotation of each cutter 106 with other operations of the machine such as, for example, the interval during which vacuum pressure is supplied to the cutters 106 from manifold 78.

As mentioned earlier, the stationary supporting tube 38, as well as the driving tube 40, terminates at the vertical midpoint of the machine in the vicinity of mechanism 144. This arrangement allows the drive shaft 36 to be coupled with the drive wheel 164 through the belt and pulley train 146-160, such power transmission from the innermost recesses of the tubes 38 and 40 to the exteriorly disposed drive wheel 164 not otherwise being possible because of interference from tubes 38 and 40. However, movement of the drive tube 40 must be transmitted to the lower half of the machine, and this is accomplished through the gearing arrangement now to be discussed. Specifically, a first large gear 174 is fixed to the drive tube 40 just above mechanism 144, and gear 174 meshes with a smaller gear 176 (FIG. 3 only) which is fixed to a short, upright shaft 178 extending in parallelism with the main drive shaft 36.

Shaft 178 extends from a level adjacent the large gear 174 downwardly to a level adjacent another large gear 180 that is fixed to the upper end of a driving tube 182 forming the lower counterpart of the upper drive tube 40. The lower termination of shaft 178 is not shown, but it is to be understood that it carries a small gear similar to gear 176, and such small gear, hidden from view in FIGS. 1 and 3, meshes with the large gear 180 to thereby drivingly couple upper drive tube 40 with the lower drive tube 182. Also, as in the upper half of the machine, a central, stationary support tube 184, the counterpart to upper stationary support tube 38, is housed within lower drive tube 182 and is structurally tied to the frame 28 in a manner not shown so as to support the lower half of the machine.

A pair of vertically spaced, circular plates 186 and 188 are fixed to the lower drive tube 182 for rotation therewith in unison, and the two plates 186 and 188 jointly support twelve carriages 190 that are spaced circumferentially about the peripheries of plates 186 and 188 in vertical registration with the cutter assemblies 88. Each carriage 190 has a central upright member 192 forming the frame thereof, and a spring-loaded, specially formed back support plate 194 is mounted on each member 192 for tilting movement toward and away from the latter. A lower horizontal pin 196 and retainer 197 hold the lower part of plate 194 stationary, and a pair of upper horizontal bolts 198 slidably support the upper part of plate 194. Coil springs 200 surrounding the bolts 198 yieldably bias each backplate 194 outwardly away from the corresponding member 192 to the position illustrated in FIG. 1, for example. Each backplate 194 has a lowermost planar section 202 of generally triangular configuration, viewing FIG. 4, as well as a pair of outturned, contoured ear sections 204 at the upper end of planar section 202 which are specially contoured to receive and help retain the hipbones of a carcass that is presented to the carriage 190 with the backbone of the carcass disposed against planar section 202.

Each carriage 190 is also provided with a U-shaped loop 206 that projects upwardly from the uppermost end of the corresponding member 192 and is outturned therefrom to dispose its outermost bight portion 206a substantially outwardly beyond the corresponding backplate 194. The loop 206 is vertically aligned with its cutter mechanism 88 so that its cutter 106 may be reciprocated downwardly through loop 206 to the position illustrated by cutter mechanism 88b in FIG. 1 wherein the helical flighting 112 is disposed at the same level as the ear sections 204.

Each carriage 190 is also provided with a swingable clamp 208 that is raised and lowered between the positions illustrated in FIG. 1 by virtue of gearing mechanism located within a box 210 on the lower end of member 192 in conjunction with a vertically reciprocable following roller 212. The roller 212 is operably coupled with a cross-shaft 214 of the clamp 208 such that as roller 212 is shifted downwardly, its clamp 208 is swung upwardly, and as the roller 212 is allowed to move upwardly, the clamp 208 may return to its lowered position. As illustrated, each clamp 208 has a generally concave, L-shaped pressure plate 216 at its outermost end which is designed to complementally receive and apply clamping pressure against the breastbone of a poultry carcass during operation.

The vertical positions of following rollers 212 are determined by a continuous, circular cam rod 218 similar to the upper cam rod 104 with various horizontal stretches of differing elevations as well as a number of inclined stretches interconnecting such horizontal stretches. Rollers 212 ride along the bottom surface of cam rod 218 and are biased upwardly against the latter by the weight of clamps 208 so as to always be in contact with some portion of the track rod 218. The latter is in turn mounted on a sleeve 220 which may be rotated relative to the stationary support tube 184 housed within sleeve 220 through the medium of a handle 222. The innermost end of handle 222 is rotatably supported on a stationary cross-pipe 224 associated with clamp 28, and the medial portion of handle 222 is threaded into a part 226 that is in turn mounted on a radially extending arm 228 fixed to sleeve 220. Thus, when handle 222 is rotated, the part 226 is threaded inwardly or outwardly along handle 222, causing the sleeve 220 to rotate in a corresponding direction and thereby rotatably displacing the cam rod 218.

OPERATION

The poultry carcasses 230 are suspended by their legs from the conveyor 20 by hangers in the nature of shackles 232 (FIG. 9) and drop rods 234 that are connected to the yokes 46 of conveyor 20. It is to be understood, of course, that the carcasses 230 approach the entry 24 (FIG. 5) of the machine in succession and that all of the carcasses 230 are acted upon by the machine as they move about its central axis and ultimately depart from the machine through exit 26. However, in order to simplify and make abundantly clear the operations which are carried out on each carcass 230 as they are processed by the machine, such processing will now be described by tracing the steps of a single carcass 230 as it moves around the machine.

With primary reference to FIG. 5, as the carcass 230 approaches the entry 24, an upper guide 236 engages the back of drop rod 234 while a lower looped guide 238 engages the front of the shackle 232 in the hock area of the carcass 230. Thus, the shackle 232 is trapped behind the guide 238 as illustrated best in FIG. 9, while the drop rod 234 is maintained in front of guide 236 at this time. This arrangement presents the drop rod 234 in proper position to be received by the notch 100 in top plate 98 of a cutter assembly 88 located approximately at position A, and at the same time, the action of guide 238 against the shackle 232 causes its carcass 230 to swing in toward the carriage 190 with the backbone of the carcass 230 facing backplate 194. The clamp 208 of the carriage in position A is fully lowered at this time, and the cutter 106 is fully retracted such that the carcass 230 is unhindered as it swings into the carriage 190.

Figures 9, 10, 11:
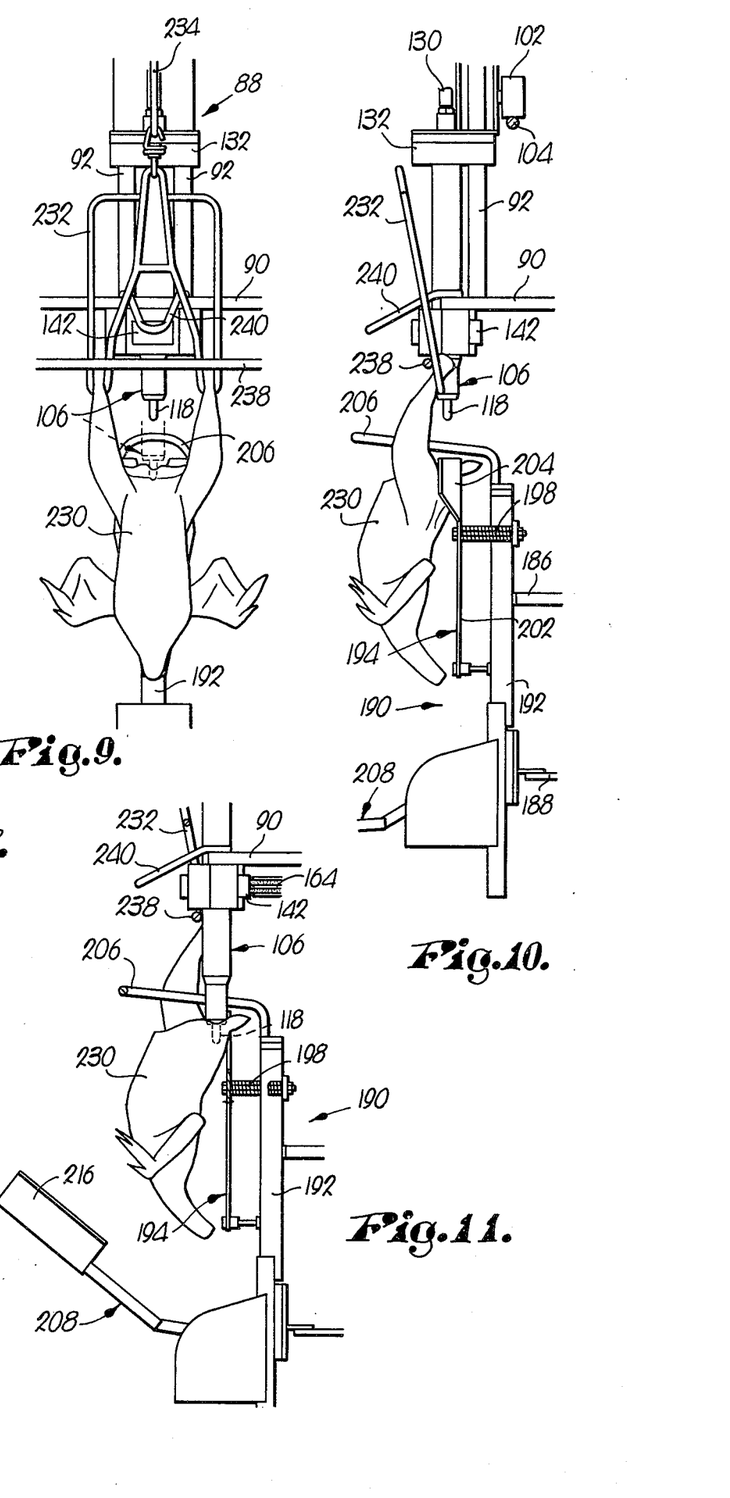
FIG. 9 is a schematic, front elevational view illustrating the condition of the apparatus and a carcass just prior to initiating severance, the dotted lines showing the position of the cutter as the probe enters the vent.
FIG. 10 is a schematic, side elevational view of the apparatus and carcass in the condition of FIG. 9.
FIG. 11 is a schematic, side elevational view similar to FIG. 10 but with certain structures removed for clarity and showing the condition of the carcass and apparatus as severance begins.

Of course, the speed of rotation of the carriages 190 about the machine is the same as the speed of advancement of the carcass 230 along conveyor track 22 because carriages 190 are driven by conveyor 20 as it yokes 46 engage the retainers 44 and rotate impulse wheel 42 to in turn drive the main tubes 40 and 182 of the machine. Thus, the carcass 230 swings neatly into the carriage 190 and, by the time carcass 230 and its carriage 190 have reached position B, the carcass 230 is in its position for severance to begin as illustrated in FIGS. 9 and 10. Note that the legs of the carcass 230 are spread apart on opposite sides of loop 206, the shackle 232 is held in proper position relative to the cutter assembly 88 by a short, outwardly and downwardly extending looped element 240 on the support plate 90, and the carcass 230 is angled slightly outwardly from backplate 194 with its hips located against ear sections 204. Note further that backplate 194 is substantially uncompressed against frame member 192 at this time.

As carcass 230 moves from position B to position C, the cutter 106 drops toward the carcass 230 with probe 118 aligned with the vent. When cutting edge 108 is just above the tissues surrounding the vent, and as probe 118 enters the vent, vacuum pressure from manifold 78 is supplied to the cutter 106 to begin adhering the tissues around the vent to cutting edge 108. Also at this time the clamp 208 begins to swing upwardly to a slight extent toward the carcass 230.

By the time position D is reached, probe 118 has fully entered the vent as illustrated in FIG. 11 and the cutting edge 108 is in full contact with the tissues surrounding the vent. The moving cutter 106 brings its driven wheel 142 into engagement with the drive wheel 164 as illustrated also in FIG. 3, and wheel 163 imparts a counterclockwise rotation to driven wheel 142, thereby rotating the cutting edge 108 to initiate severance of the tissues.

Figure 12:
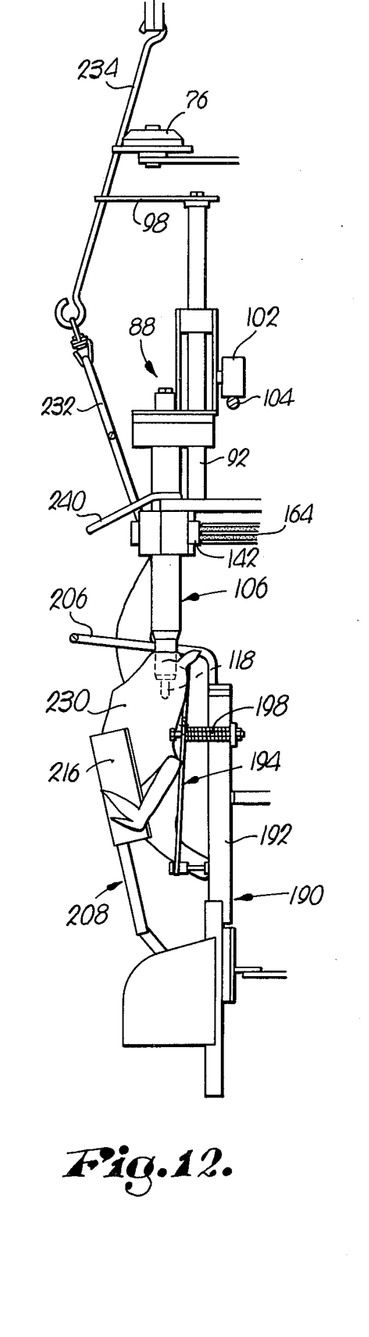
FIG. 12 is a schematic, side elevational view similar to FIG. 11, showing the condition of the carcass and apparatus as the carcass is rocked to change the angle of entry of the cutter.
Figures 13, 14:
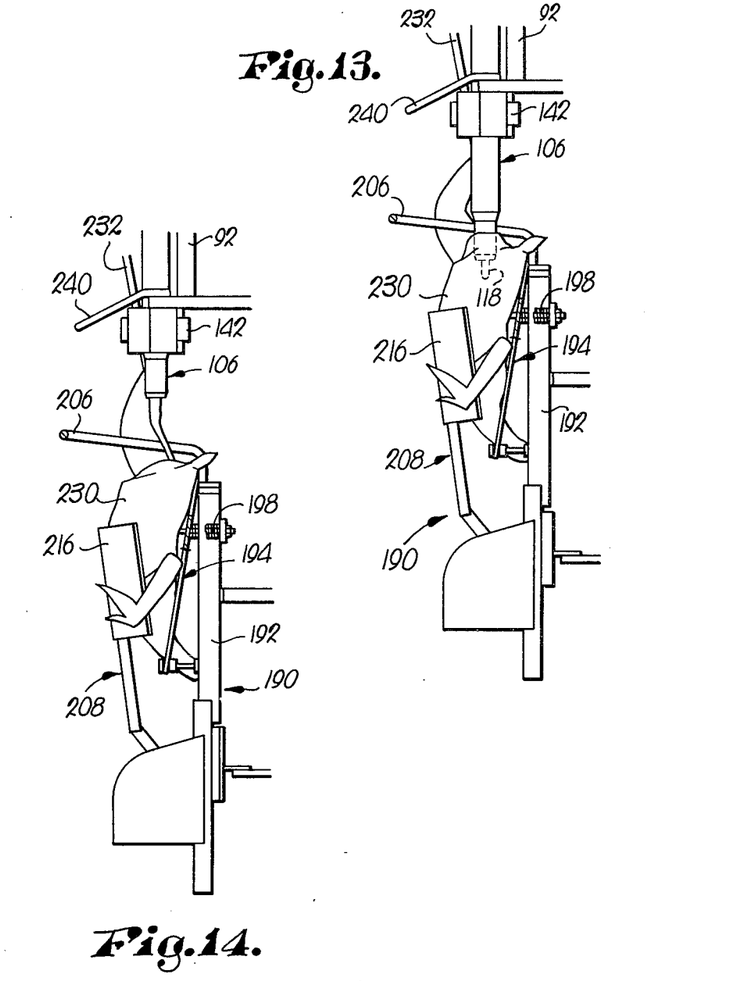
FIG. 13 is a schematic, side elevational view similar to FIG. 12 showing the manner in which tissues surrounding the vent climb up the outside of the cutter during severance.
FIG. 14 is a schematic, side elevational view similar to FIG. 13 showing the cutter retracted with the vent adhered to the cutter through vacuum pressure in order to withdraw the vent and connected organs from the carcass.

While the carcass 230 is passing position D, a number of other movements are also taking place. In this regard, the cutter 106 continues to enter the carcass 230 but only for a very short distance as the lowermost stretch of cam rod 104 is reached by the following roller 102. The entry of cutting edge 108 is far enough that helical flighting 112 engages the tissues around the vent and forces them to climb abruptly up the outside of cutter 106 for a short distance as represented in FIGS. 12 and 13. Thus, although further downward movement of the cutter 106 relative to carriage 190 has terminated, severance of the tissues continues as they climb up the outside of cutter 106. This is of extreme benefit because the tissues surrounding the vent contain a large amount of fat which can be difficult to sever and normally requires that the cutting tool be forced deeply into the body cavity of the carcass. Such deep penetration, however, exposes the entrails to the cutting tool, thus increasing the risk that the entrails will be severed or broken to spill their fecal contaminants over the meaty portions of the carcass. By effectively bringing the tissues to cutting edge 108 with helical flighting 112 while the remainder of carcass 230 stays behind, complete severance of the tissues is assured and yet cutting edge 108 may be maintained a safe distance above the bulk of the entrails located within the body cavity of carcass 230, thereby minimizing the chances that the entrails will be damaged.

At the same time that the tissues climb cutter 106, the clamp 208 swings up against the breast of the carcass 230 as illustrated in FIG. 12 and the drop rod 234 encounters the sprocket wheel 76. Sprocket wheel 76 serves as a deflector as it pushes drop rod 234 outwardly from its previous path of travel to thereby pull the carcass 230 tightly upwardly against loop 206. This action, in conjunction with the continued upward and inward swinging of clamp 208, causes the carcass 230 to be rocked endwise as may be seen by comparing FIGS. 11 and 12. In FIG. 11 the backbone of the carcass is angled outwardly from backplate 194 with only the uppermost end of carcass 230 in actual engagement with backplate 194. Thus, in the condition of FIG. 11, cutter 106 enters carcass 230 at an angle with respect to the backbone. However, as carcass 230 is rocked downwardly and inwardly to bring its backbone flatly against backplate 194, the angle of entry of cutter 106 is changed so that cutter 106 now moves substantially parallel to the backbone rather than at an angle thereto. This unique rocking motion and modification of the angle of entry of cutter 106 causes cutting edge 108 to move first into close proximity to the backbone and subsequently generally along the latter whereby to fully and completely sever the membranes that attach urinary organs and the sphincter muscle to the backbone. Hence, such articles are fully detached from the backbone and are left secured only to the vent as the latter is received within the chamber 110 of cutter 106 during this severance.

Swinging of the clamp 208 against the breast of the carcass 230 continues as the carcass 230 advances to position E so that the backplate 194 is pressed in at its upper end against frame member 192 and against the resistance of compression springs 200 as shown in FIG. 13. This completes the rocking action of the carcass 230 and causes the final position of cutter 106 to be forwardly of its initial entry position relative to the backbone of carcass 230, hence dragging the cutting edge 108 along membranous tissue around the vent to fully break the vent free from the remainder of the carcass 230. By this time, the driven wheel 142 has left drive wheel 164 (as shown in FIG. 3) such that rotation of cutter 106 has terminated, and the vent is ready to be pulled from carcass 230.

While the carcass 230 passes points F and G the cutter 106 is withdrawn as vacuum pressure continues. Hence, the vent remains fully adhered to cutter 106 within the chamber 110 so that the vent is withdrawn from carcass 230 with the retracting cutter 106 as illustrated in FIG. 14. Another arcuate guide 242 begins where the first guide 238 leaves off, and the latter guide 242 is spaced radially outwardly from the central axis of the machine a greater distance than guide 238 so that the shackle 232 is allowed to swing outwardly to a limited extent through positions F, G and beyond, the guide 242 serving only to restrain shackle 232 against rotation at this time.

Figure 15:
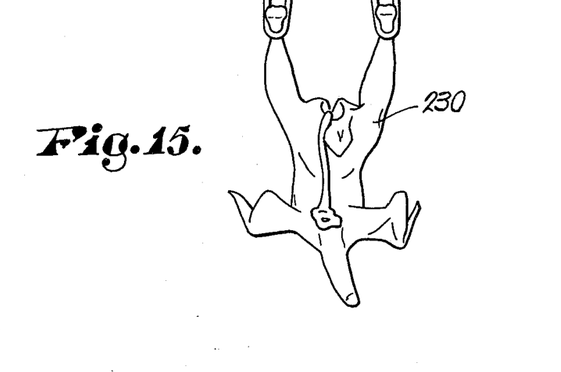
FIG. 15 is a schematic, rear elevational view showing the vent draped over the outside of the carcass after the vent-removing process has been completed.

Carcass 230 then approaches position H and exit 26, and approximately at this time the vacuum pressure to cutter 106 is terminated and clamp 208 is swung outwardly and downwardly away from backplate 194 to release carcass 230 from carriage 190. The conveyor 20 and carcass 230 continue outwardly beyond position H through exit 26 while cutter 106 and carriage 190 move around the machine back toward entry 24, thus causing the vent to be pulled free of cutter 106 and to be draped loosely over the outside of the carcass 230 as illustrated in FIG. 15. In the condition of FIG. 15, the carcass 230 is thus in ideal condition for further processing and inspection.

The above procedure is of course repeated many times over as poultry carcasses are presented in succession to the machine. It should be readily apparent that the vent-removing process is safe, sanitary and efficient and is carried out in a fully automated manner. If necessary, timing of the various operations being performed on the carcasses can be readily modified through the adjusting handle 62 to change the position of deflecting sprocket 76, the setscrew 168 to shift drive wheel 164, and the adjusting handle 222 to change the respective position of the high and low stretches of cam rod 218 at the lower end of the machine. Although not shown, it will be understood that structure similar to that provided for lower cam rod 218 may also be provided for upper cam rod 104, thereby providing for adjustment of extension and retraction of the cutters 106.

Having thus described the invention, what is claimed as new and desired to be secured by Letters Patent is:

1. Apparatus for removing the vent from a poultry carcass including:
   a conveyor for advancing a number of carcasses along a predetermined path of travel;
   a series of hangers carried by said conveyor for suspending the carcasses in succession from the conveyor as they are advanced;
   at least one carriage movable along its own path of travel disposed to intersect that of the carcasses for advancement of the carriage and an adjacent carcass together,
   said carriage being provided with means for locating a carcass on the carriage in position for processing while the carriage and carcass advance together;
   a cutter mounted for movement with said carriage and supported for reciprocation relative to the latter for cutting the vent from the carcass on the carriage during shifting of the cutter in one direction as advancement continues; and
   means associated with said cutter for pulling the severed vent from the carcass during shifting of the cutter in the opposite direction and while the carriage and carcass continue to advance.

2. Apparatus as claimed in claim 1, wherein said means for pulling the vent from the carcass includes structure defining a suction head.

3. Apparatus as claimed in claim 1, wherein said cutter is rotatable, and wherein is provided mechanism for driving the cutter for a predetermined interval during reciprocation of the cutter.

4. Apparatus as claimed in claim 3, wherein said mechanism is operable to terminate rotation of the cutter before the latter is shifted in said opposite direction.

5. Apparatus as claimed in claim 1, wherein is further provided means for initially orienting the carcass with its backbone angled across the path of reciprocation of the cutter for initial entry of the cutter into the carcass generally toward the backbone.

6. Apparatus as claimed in claim 5, wherein is further provided means for rocking the carcass endwise after severance has been initiated to reorient the carcass with its backbone generally parallel to the path of reciprocation of the cutter for further severance by the cutter generally along the backbone.

7. Apparatus as claimed in claim 6, wherein said rocking means includes a swingable clamp on said carriage operable after the cutter has initiated severance to press the carcass against the carriage.

8. Apparatus as claimed in claim 7, wherein said carriage is provided with a support plate disposed to backup the carcass during clamping, said plate being spring-loaded to yield under pressure from the clamp and carcass.

9. Apparatus as claimed in claim 8, wherein said plate has one end adjacent the cutter and an opposite end remote from the cutter, said opposite end being held against movement under pressure by the carcass and clamp and said one end being yieldable under such pressure for tilting of the plate after severance along the backbone of the carcass.

10. Apparatus as claimed in claim 6, wherein said rocking means further includes a deflector disposed in the path of travel of said hangers for successively displacing the same in a direction to pull the carcass toward the cutter.

11. Apparatus as claimed in claim 10, wherein said locating means on the carriage includes a stop for limiting pulling of the carcass toward the cutter during its rotation.

12. Apparatus as claimed in claim 1, wherein said cutter is rotatable during its shifting in said one direction, said cutter being provided with means for causing tissues surrounding the vent to climb the cutter during said rotation.

13. Apparatus as claimed in claim 12, wherein said climbing means comprises helical flighting wound about the cutter in the direction of reciprocation thereof.

14. In apparatus for removing the vent from a poultry carcass:
   an elongated, tubular cutter having an annular cutting edge at one end thereof;
   means mounting said cutter for rotation about its longitudinal axis for severing tissues surrounding the vent when the cutting edge is applied to such tissues,
   said cutter having an annular wall leading away from said cutting edge toward the opposite end of the cutter and defining an interior receiving space for the vent as the cutting edge penetrates the tissues; and
   means on the outside of said wall adjacent said edge for causing said tissues to climb the wall during penetration by said edge whereby to assure complete severance of the tissues.

15. In apparatus as claimed in claim 14, wherein said climbing means comprises helical flighting around said wall and leading away from said edge.

16. In apparatus as claimed in claim 15, wherein said flighting is set back from said edge.

17. In a method of removing the vent from a poultry carcass, the steps of:
   conveying a carcass along a predetermined path of travel;
   intercepting the advancing carcass with a moving support and retaining the carcass against the support for advancement of the carcass and support together over a predetermined distance;
   maintaining the support and carcass in registration with a rotary cutter as said predetermined distance is traversed;
   applying said cutter against the tissues of the carcass surrounding the vent to sever the latter from the carcass while the carcass is against the support;
   disengaging the cutter from the carcass while pulling the vent with the cutter whereby to withdraw the vent from the carcass;
   releasing the grip on said vent by the cutter to hang the vent on the outside of the carcass; and
   separating the support and carcass from one another after said predetermined distance has been traversed.

18. In the method as claimed in claim 17, wherein said pulling on the vent by the cutter includes applying vacuum pressure against the vent through the cutter.

19. In the method as claimed in claim 17, wherein said cutter is shifted along a straight line of travel into the carcass and angled toward the backbone early in said applying step, and wherein the carcass is then rocked endwise to reorient the carcass for movement of the cutter generally along and parallel to the backbone.

20. In the method as claimed in claim 17, wherein is further included the step of forcing said tissues to climb up the outside of the cutter during said applying step.

21. In the method as claimed in claim 20, wherein said tissues are threaded up the cutter during said climbing.

* * * * *